United States Patent
Frederick

(10) Patent No.: US 6,912,483 B2
(45) Date of Patent: Jun. 28, 2005

(54) IN-PLACE DYNAMICALLY RE-SIZEABLE PERSISTENT HISTORICAL DATABASE

(75) Inventor: Jesse R. Frederick, Nevada, IA (US)

(73) Assignee: Daniel Measurement and Control, Inc., Houston, TX (US)

( * ) Notice: Subject to any disclaimer, the term of this patent is extended or adjusted under 35 U.S.C. 154(b) by 512 days.

(21) Appl. No.: 10/085,288

(22) Filed: Feb. 28, 2002

(65) Prior Publication Data

US 2003/0163475 A1 Aug. 28, 2003

(51) Int. Cl.$^7$ ............................................. G06F 12/00
(52) U.S. Cl. ......................... 702/187; 702/45; 707/100
(58) Field of Search .................... 702/187, 79, 176, 702/178, 31, 32, 45, 50, 55, 100, 114, 186, 179, 180; 707/1, 100, 101, 102; 713/178; 711/1, 100–102, 104, 170–173; 73/23.2, 861, 861.02, 861.03; 700/281, 283, 266; 422/83, 92

(56) References Cited

U.S. PATENT DOCUMENTS

| | | | | |
|---|---|---|---|---|
| 5,006,992 A | * | 4/1991 | Skeirik | 706/58 |
| 5,226,153 A | * | 7/1993 | DeAngelis et al. | 714/45 |
| 5,437,163 A | * | 8/1995 | Jurewicz et al. | 62/126 |
| 6,272,445 B1 | * | 8/2001 | Cheale et al. | 702/187 |

* cited by examiner

*Primary Examiner*—Hal Wachsman
(74) *Attorney, Agent, or Firm*—Mark E. Scott; Conley Rose, P.C.

(57) ABSTRACT

The specification discloses a method of maintaining a historical database of information. The method describes up to eleven segments, each segment corresponding possibly to a different data logging rate in the historical database. Points, whether measured or calculated parameters, are grouped into segments based on which points may have their data logged at the same frequency. The points, in turn, contain pointers to logs, with entries in the log data corresponding to a time-stamp or tag of the segment to which the log belongs. Thus, points (and their corresponding logs) in different segments may be logged at different rates. The specification also discloses a method for dynamically resizing the historical database.

16 Claims, 4 Drawing Sheets

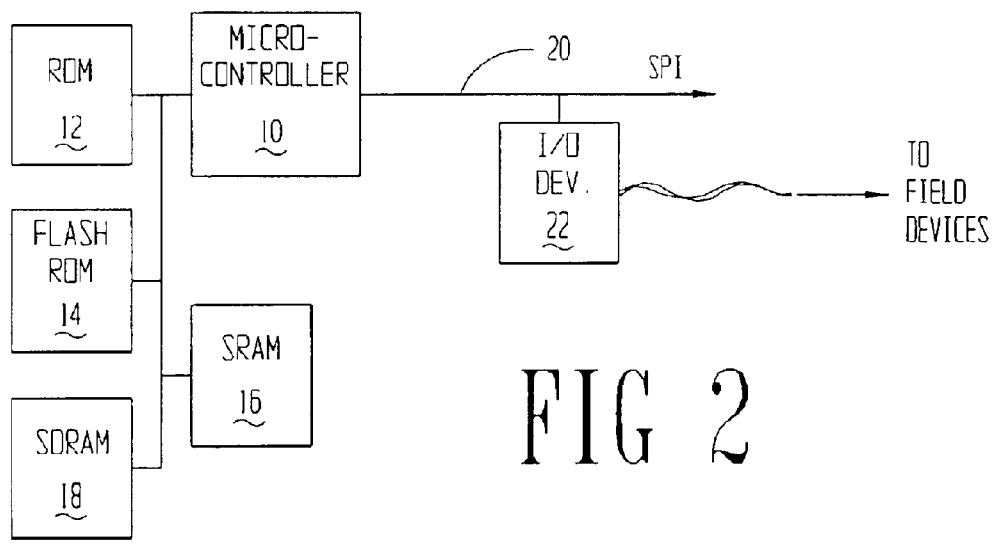
FIG 1 (PRIOR ART)
FIG 2
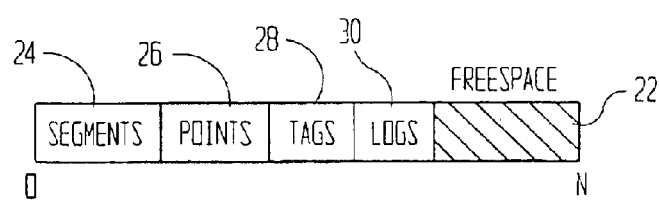
FIG 4

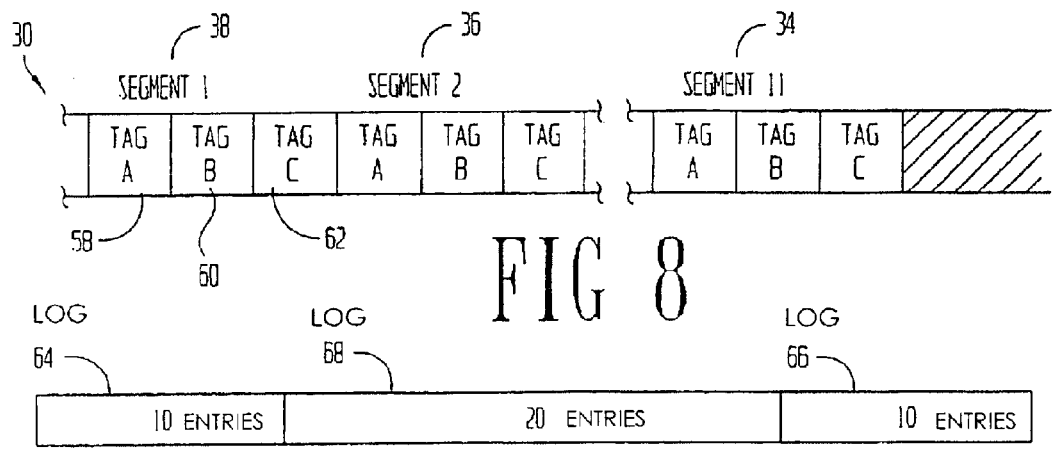
FIG 8
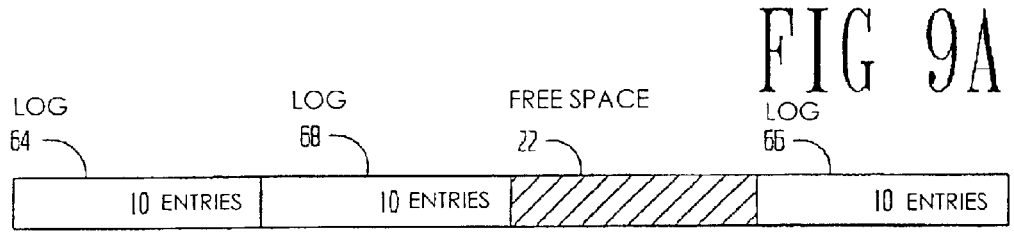
FIG 9A
FIG 9B
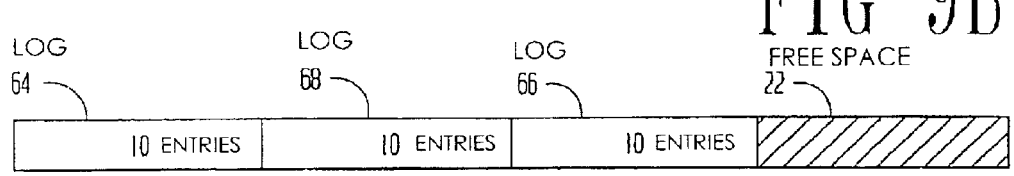
FIG 9C
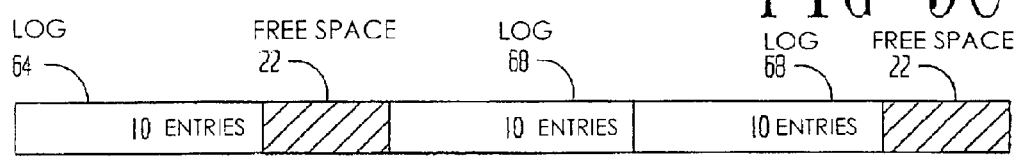
FIG 9D
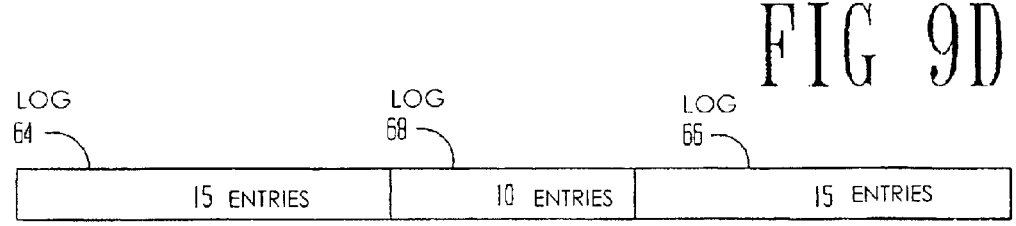
FIG 9E

IN-PLACE DYNAMICALLY RE-SIZEABLE PERSISTENT HISTORICAL DATABASE

CROSS-REFERENCE TO RELATED APPLICATIONS

This application is related to co-pending application Ser. No. 10/085,298, titled "Method and System for Limiting Use of Embedded Software," filed on Feb. 28, 2002, and incorporated by reference as if reproduced in full below.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to maintaining historical databases of information. More particularly, the preferred embodiments are directed to an in-place dynamically re-sizeable historical database for gas flow measurement and logging systems.

2. Background of the Invention

Since the advent of computer systems, engineers have used the computer to monitor and control real-time systems. Part of the monitoring feature is the ability to maintain databases of historical information regarding the parameters or processes monitored and/or controlled. Without regard to hardware constraints imposed by physical systems, the most logical way to store logged information or data is to write the information to a memory, for example a random access memory (RAM) location, and also write a corresponding time-stamp. In such an oversimplified scheme, the frequency at which data is sampled and written is of no concern. Each parameter may be sampled, written to the historical database, and correspondingly time-stamped without regard to other parameters in the historical database or the physical size of the memory device.

The scheme described where each stored parameter has a corresponding time-stamp, while possible, is not practical in that such a database may require significant electronic storage space. In order to address this problem, the related art approach has been to sample the parameters substantially simultaneously, write the parameter values to the database, and apply a single time-stamp applicable to all the entries. The greater number of parameters that can be associated with a single time-stamp, the greater the space savings in long-term storage. FIG. 1 shows, in a more graphical form, the related art method of having one time-stamp associated with multiple parameters. In particular, FIG. 1 shows that a time-stamp 4A may be associated with multiple parameters 1, 2 and 3. Progressing from the top of the figure to the bottom, each time-stamp 4A–E represents the time in which the parameters 1, 2 and 3 were recorded in the historical database.

While such an arrangement represents an improvement over having a time-stamp associated with each parameter written, problems still exist. For example, should one of the parameters need to be logged (written to the database) at an unscheduled time, each and every parameter associated with the time-stamp must be written. While the exemplary system of FIG. 1 shows only three parameters 1, 2 and 3 associated with each time-stamp 4A–E, where tens or hundreds of parameters are associated with a single time-stamp, logging each of the parameters simply because only one of the parameters is needed quickly erodes the space savings associated with the time-stamping procedure.

Yet another problem exists with storing data in the fashion described in FIG. 1; namely, there is not a way to modify the number of samples of a parameter or group of parameters associated with the single time-stamp without likewise affecting all the parameters logged.

Thus, what is needed in the art is a structure and method to increase time-stamping efficiently for multiple parameters with the ability, however, to dynamically re-size the historical information.

BRIEF SUMMARY OF SOME OF THE PREFERRED EMBODIMENTS

The problems noted above are solved in large part by a method of maintaining a historical database of information that groups points into segments, the time-stamp associated with a segment is applicable to all points in the segment. Points in different segments are associated with different time-stamps, and thus may have data logged at different frequencies. Relatedly, the specification also describes a method to dynamically re-size the historical database of information to accommodate the end user making such modifications.

In particular, the preferred embodiments describe the ordering of information within a continuously addressed set of memory locations. The first component in this continuously addressed set is the segments component, followed by the points component, the logs component, the tags component and thereafter free space. In the preferred embodiments, the segments component contains eleven segments, with each segment having pointers to points that have been assigned or are grouped into the segment. The points component 26 preferably comprises up to 200 points, each point related to a parameter of interest. Each point preferably contains three pointers which give the locations within the continuous memory addresses where parameter data is written. Finally, the tags component 30 represents the portion of memory where the time-stamps or tags are placed. In the preferred embodiment, each segment has a corresponding set of tags, and these tags are applicable to all logged data for points grouped within the segment.

Another feature of the preferred embodiments is the ability to dynamically resize the historical database. It is possible to increase the number of entries for logged information in the preferred embodiments without the loss of historical data. In the preferred embodiments, this is accomplished by shifting the logs and tags components to effectively relocate free space to be proximate to the logs whose number of entries needs to be increased. The free space is then assigned to the log whose number of entries was increased. In this way, the historical database need only continue writing in the defined area of the memory without the requirement of overwriting historical data.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which:

FIG. 1 shows a prior art method of applying time-stamps to historical data;

FIG. 2 shows, in block diagram form, the various hardware components of the preferred embodiments;

FIG. 4 shows, in simplified block diagram form, the physical arrangement in memory of the historical database of the preferred embodiments;

FIG. 8 shows a more detailed description of physical placement of the time-stamps for the segments;

FIG. 9A shows an exemplary set of logs;

FIG. 9B shows a partial first step in shrinking one of the logs;

FIG. 9C shows the shrink of one of the log entries complete with the free space relocated to the end of the physical memory;

FIG. 9D shows a partial first step in increasing the size of two of the log entries; and FIG. 9E shows an adjusted set of log entries.

NOTATION AND NOMENCLATURE

Figure 3:
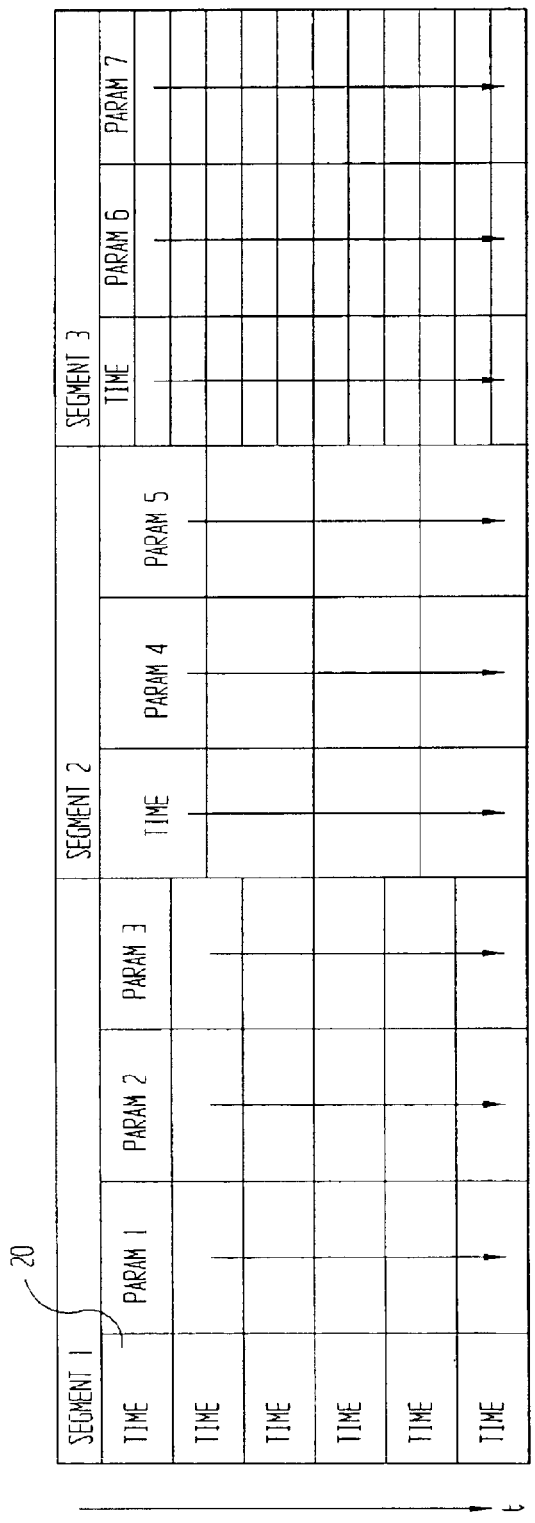
FIG. 3 shows a logical configuration of the segments, parameters and time-stamps of the preferred embodiments.

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to ... ". Also, the term "couple" or "couples" is intended to mean either an indirect or direct electrical connection. Thus, if a first device couples to a second device, that connection may be through a direct electrical connection, or through an indirect electrical connection via other devices and connections.

There are many terms used herein that have a special meaning in the description of the preferred embodiment. However, once understanding these terms and the description that follows regarding the preferred embodiments, one of ordinary skill could devise many equivalent systems and use of different terms to describe the equivalent system, and as such would not take the equivalent systems beyond the contemplation of this invention. Thus, the following terms are specifically defined:

Entry—a specific value of a monitored or calculated parameter written to a database.

Log—a group of entries of a monitored or calculated parameter.

Point—a logical grouping of a plurality, in the preferred embodiments 3, logs associated with a single monitored or calculated parameter.

Segments—a logical grouping of points which share a sample frequency and corresponding set of time-stamps.

DESCRIPTION OF THE PREFERRED EMBODIMENTS

The preferred embodiments of the present invention are directed generally to maintaining a historical database of information. More particularly, the preferred embodiments were developed in the context of maintaining a historical database of calculated volumetric flows in natural gas production and metering facilities, possibly having many metering locations; thus, the preferred embodiments are described in the gas flow metering context. However, the description of the preferred embodiments in the context of natural gas flow metering should in no way be construed as a limitation as to the breadth and applicability of the methods described below. One of ordinary skill in the art, after understanding the description that follows, could easily apply the historical database the methods to other equivalent situations.

The preferred embodiments of the present invention are implemented in an embedded microcontroller performing gas flow metering operations. FIG. 2 shows in block diagram form the preferred hardware for the embedded system. In particular, the heart of the system is the microcontroller 10. In the preferred embodiments, the microcontroller is a MOTOROLA® MPC862SR; however, any microcontroller or microprocessor may be equivalently used. Preferably a read only memory (ROM) device 12 couples to the microprocessor. The ROM 12 preferably contains software programs, executable by the microcontroller 10, that perform specific tasks. In particular, the ROM 12 preferably contains at least an operating system that handles low level messaging and input/output (I/O) tasks. The preferred embodiments also comprise a FLASHROM 14 coupled to the microcontroller 10. The FLASHROM 14 preferably contains software programs executable by the microcontroller 10 that implement the historical database functionality of the preferred embodiments. That is, one or more software programs on the FLASHROM 14 are executed by the microcontroller and preferably maintain the historical database of information in the battery backed static random access memory (SRAM) 16, which in the preferred embodiments is one megabyte in size. The synchronous dynamic RAM (SDRAM) 18 also couples to the microcontroller 10 and forms the working area for the various software programs executed by the microcontroller 10.

In order to read field data or parameters, the microcontroller 10 couples to a serial peripheral interface (SPI) bus 20. An I/O device 22 couples to the SPI bus 20, and the I/O device 22 couples to various field devices. In the case of measuring natural gas flow, the field devices may comprise pressure transmitters, differential pressure transmitters, thermocouple transmitters, RTD transmitters, and the like. Although only one such I/O device 22 is shown in FIG. 2, many specialized I/O devices may be required to access necessary information to calculate volumetric flows, which are stored in the historical database in the SRAM 16.

The preferred embodiments of the present invention define a plurality of segments into which monitored or calculated parameters are grouped for time-stamping purposes. FIG. 3 shows an exemplary block diagram of a three-segment, seven parameter historical database. It must be understood, however, that FIG. 3 does not purport to be a logical configuration for organizing the segments, time-stamps and parameters, but merely is a tool to exemplify the preferred groupings. In particular, FIG. 3 shows a first segment (segment 1) in which a first parameter (param 1), a second parameter (param 2) and a third parameter (param 3) are grouped. It is assumed that time increases down FIG. 3 such that logged parameters near the top of the graph occur earlier in time than logged parameters near the bottom. Thus, in the exemplary first segment, one time-stamp, for example time-stamp 20, marks the recordation time for the three parameters.

Referring still to FIG. 3, the second segment has associated therewith a fourth parameter (param 4) and a fifth parameter (param 5). Thus, in the second segment each time-stamp is a recordation time of two parameters. The exemplary drawing of FIG. 3 also shows that the frequency at which the fourth parameter and the fifth parameter are sampled and written is greater than the exemplary sample period of the first segment. Thus, for the same amount of time, fewer samples are taken. In a similar discussion, the third segment has grouped therein sixth and seventh parameters (param 6 and param 7). Each time-stamp in the third segment is thus also associated with two parameters; however, the exemplary sample rate in the third segment is roughly twice that of the first segment, further exemplifying that the sample rate in each of the segments need not necessarily be related to the other segments. Although FIG. 3 shows that at some point samples of all the parameters occur simultaneously, this need not necessarily be the case.

FIG. 4 shows a high level overview of the preferred layout of the SRAM 16 for storing the historical data values. In the preferred embodiment, the SRAM 16 memory is addressed from a beginning location, having the smallest address, to an end location, having the largest address, in a continuous fashion. In this way, each location of memory in the SRAM 16 may be known by knowing the starting or beginning address and an offset into the SRAM. In the preferred embodiments, the addressing scheme starts at the smallest address, labeled 0 in FIG. 4, and ends at the biggest address, labeled N in FIG. 4. While utilizing the SRAM in this way is preferred, the placement may equivalently be from the largest addresses to the smallest. To the extent the historical database of the preferred embodiments does not occupy the entire memory area of the SRAM 16, preferably the free space 22 has the higher addresses.

FIG. 4 also shows the four major components of the historical database of the preferred embodiments. Segments 24 are logical groupings of points that use the same time-stamps or tags, as shown in FIG. 3. In the preferred embodiments, eleven segments are used, whether or not the segments contain points. FIG. 4 also shows that the next component in the preferred system are the points component 26. A point generally refers to a single parameter, for example a differential pressure or a calculated volumetric flow, but is itself not where historical data values are stored. The points of the preferred embodiment, however, do maintain in their respective memory locations various pieces of information that are helpful in the overall database structure. This information may comprise a number of samples since the last log (a log value may write only once every five minutes, but the parameter may be sampled every second or less), a minimum value achieved of the particular parameter over some period of time, and a maximum value achieved by the parameter over some period of time. All this information is preferably stored in the SRAM memory in the area designated by points 26. Each point also comprises pointers to, or addresses for, logs (which contain actual data values or entries).

The next major component in the overall data structure in the SRAM 16 is the tags component 28. The tags may alternatively be referred to as time-stamps. The tags 28 represent times at which log values were written to the SRAM. Referring briefly again to FIG. 3, it is seen that each time the three parameters are written, a time-stamp 20 is applied which indicates the time at which the values were stored. Likewise, the tags component 28 of the overall historical database in the SRAM 16 indicates when log values are written.

The final component of the overall storage structure in the SRAM 16 shown in FIG. 4 are the logs 30. Logs contain actual data values written to the historical database in SRAM 16. Three such logs preferably exist for every point (or parameter). In the preferred embodiments, the three logs are one each configured to write: once every minute, periodic (configurable by the user), and daily. Further, the precise value of the parameter written in each of the log locations is configurable by the end user. For example, the daily value may be an average, an accumulated value, a totalized value, a current value, and the like.

Figure 5:
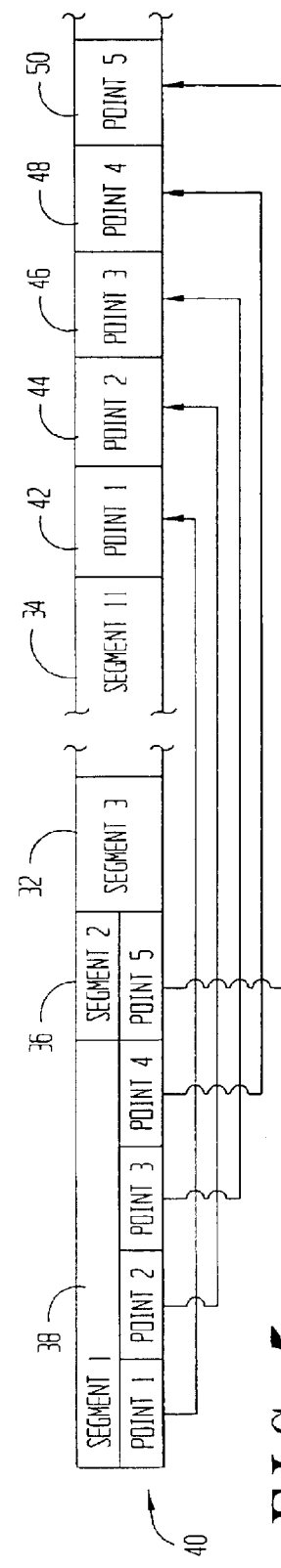
FIG. 5 shows the relationship between points assigned to a particular segment and where the points themselves reside in physical memory.

FIG. 5 shows the preferred relationship between the memory areas in the SRAM containing the segment information and the memory in the SRAM containing points information. In particular, FIG. 5 shows that segments may have no points (third segment 32 and eleventh segment 34), may have only a single point (second segment 36), or may have a plurality of points (first segment 38). In the preferred embodiments, up to 200 points may be used, these points spread about the various segments. If the first segment 38 has 200 points, then the remaining segments have no points. Each segment preferably contains pointers (indications of the addresses in SRAM) where each of their assigned points reside. In the exemplary system of FIG. 5, the first segment 38 has four pointers 40, which indicate where in the memory area bounded by the SRAM 16 the points reside. Arrows underneath the figure symbolically indicate how the pointers 40 give the addresses of the assigned points. In particular, the first segment 38 has pointers 40 to the first point 42, the second point 44, the third point 46, and the fourth point 48. In a similar discussion, the second segment 36 has a pointer that gives the location of the fifth point 50. Before proceeding, it must be understood that the points need not be broken up into the various segments in order. The fifth point, or the one-hundred ninety-fifth point (not shown on FIG. 5), could both be assigned to the first segment, while the tenth through twentieth points could be assigned to the eleventh segment 34. FIG. 5 is merely to exemplify how the segments are high level groupings for points.

Figure 6:
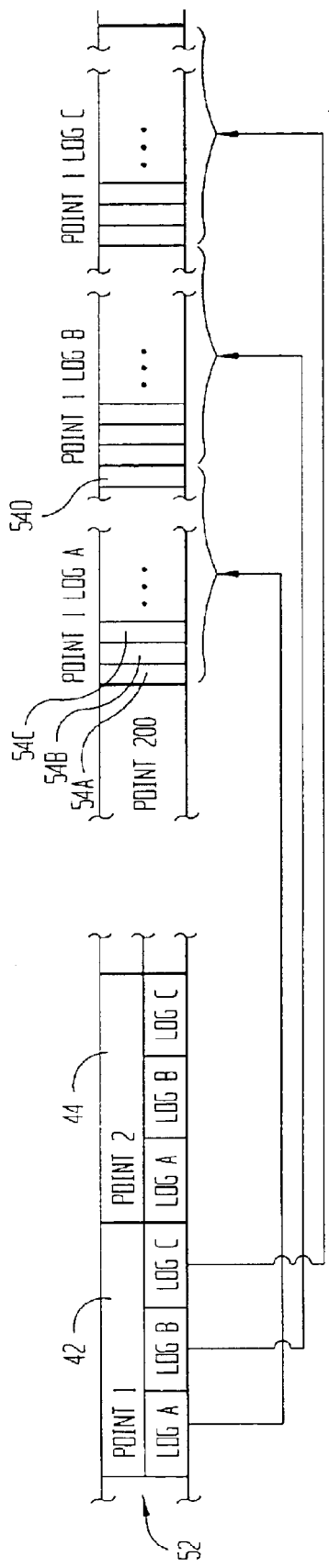
FIG. 6 shows the relationship between points in physical memory and the logged data for those points.

FIG. 6 shows the relationship between the information contained in each point, for example the first point 42 and the second point 44, to the log component 30 (see FIG. 4). In the preferred embodiments, the memory locations that comprise each point preferably contain pointers (or addresses) to locations within the SRAM 16 where log values are placed. In the exemplary system of FIG. 6, the first point 42 contains the preferred three log pointers 52 that point to particular memory locations. The arrows beneath FIG. 6 exemplify how the pointers 52 point to particular memory locations within the SRAM 16. FIG. 6 also shows that, in the preferred embodiments, the log memory locations are operated in a circular fashion. Each log (for example the first point log A) has a fixed size in memory. Once logged data has filled all the memory locations, the newest entry overwrites the oldest entry in a circular fashion. Thus, entry 54A–C may represent the newest three pieces of logged data in the first point log A before wrapping back within the log to entry 54D. Having now described the relationship between the points and their corresponding log data, the next consideration is the relationship between the logged data and the time-stamps or tags.

Figure 7:
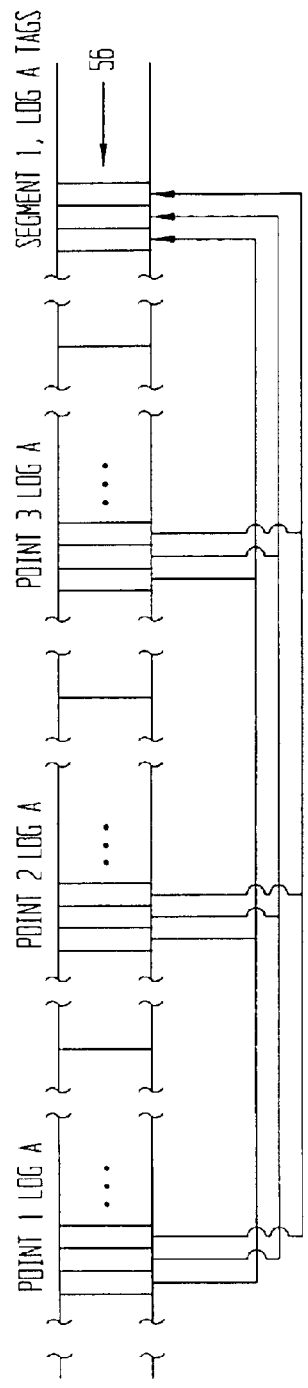
FIG. 7 shows the relationship between logged data and a corresponding time-stamps associated with the segment to which the log data belongs.

FIG. 7 shows an exemplary relationship between logs for points, grouped in a segment, and their time-stamps or tags. Referring briefly again to FIG. 5, it is seen in the exemplary historical database that the first point 42, second point 44, and third point 46 are all grouped in the first segment 38. In the preferred embodiments, points (and their corresponding logs) which belong to the same segment share time-stamps or tags. FIG. 7 thus shows that for the first point log A, second point log A, and third point log A (for example, the minute logs for each of these points), the corresponding time-stamps are the first segment log A tags. The lines beneath FIG. 7 indicate this correspondence. Although not shown in FIG. 7, the "log B" portions of all the points in the first segment use as their time-stamps a set of corresponding "log B" tags (for example, hourly logs for each of the points), and so on for the "log C" portions of the points. Thus, there exists three sets of tag entries for each segment, the tag entries applicable to the log entries for each point grouped within the segment.

To complete the picture, the tags component 28 of the overall memory space that comprises the historical information (FIG. 4) is divided up into sets of time-stamps for each of the segments. Inasmuch as points within each segment have three logs, correspondingly, the tags 28 for each segment contain three sets of time-stamps. The tag section 28 also has corresponding entries for the second through eleventh segments, each tag having three data areas for time-stamps thereunder.

Summarizing the preferred structure of the historical database before continuing, the overall memory area that makes up the historical database is divided up into a segment component 24, a point component 26, a tag component 28, a log component 30, and free space 22 (FIG. 4). The segment component 24 is preferably a fixed size, and comprises eleven segments. To the extent any particular segment has points grouped therein, the assigned segment also comprises pointers to the points component 26 of the overall memory. The next portion of the overall memory is the points component 26. In the preferred embodiment, 200 such points may exist and are available for use. The points component 26 is preferably a fixed size. Each point entry in the points component 26, if used, contains a pointer to the log component 28 of the historical database. More particularly, each point component has a pointer that identifies what portion of the logs component 28 of the overall memory contains actual data values for the point. In the preferred embodiment, each point contains three logs; therefore, each point within the point component 26 preferably has three pointers to memory locations where the actual log data is stored. The tags component 28 is the location within the historical database where the time-stamps or tags are stored, organized by segment. Finally, the logs component 30 preferably contains actual logged data. Because in the preferred embodiment the points (and corresponding logs) grouped within a segment share time-stamps with other points (and logs) within that segment, only three sets of time-stamps are needed for all the points (and the corresponding logs) within a segment. In this way, data values may be written to the overall memory, with each segment having a different recordation frequency. Referring again to FIG. 3, it is seen that parameters within the first segment may be logged at a different frequency than parameters within the second and third segment. Additionally, and if grouped properly, it is possible that external conditions can control the frequency at which points within the segments are logged. For example, during steady state conditions, gas flow measurements may be logged only every hour; however, during disturbances, for example changes in flow or unexpected pressure drops on the transmission line, the gas flow points within the segment may be logged every five minutes, and this change in logging frequency does not affect the points (and corresponding logs) in other segments.

Another feature of the preferred embodiment is the ability to dynamically resize the amount of information stored within the historical database, to the extent the SRAM 16 has sufficient free space to accommodate the additional size. Relatedly, the preferred embodiments may also reduce the amount of information any log contains. In the case of increasing the size or number of entries, this may be done in the preferred embodiments without loss of the historical data. In the second case, by its very nature, some information will be lost, but preferably only the older information is discarded to make room for the smaller number of entries. FIG. 9A shows an exemplary set of log entries. In this exemplary system, log entries 64 and 66, each containing an exemplary ten entries, preferably belong to the same segment. This means that entries 64, 66 share time-stamps or tags in the historical database (but these tags are not shown in FIG. 9A for purposes of clarity). Likewise, FIG. 9A shows a second set of logs 68 having twenty entries therein. In order to exemplify the preferred method of re-sizing the database, it is assumed that an end user wishes to increase the number of entries in the logs 64 and 66 from ten to fifteen, and correspondingly decrease the size or number of entries in the log 68 from twenty to ten. As mentioned with respect to FIG. 4, in the preferred embodiments the historical database is held in a compact manner in that any free space within the SRAM 16 is preferably contained near the end of the historical database. Thus, increasing the number of entries in a log, for example increasing log 64 from ten entries to fifteen entries, requires shuffling of free space to be in the proper location. Stated otherwise, at the location where free space is required, the remaining portions of the database are shifted. The first step in this exemplary process is shrinking the number of entries for the log 68. FIG. 9B shows the free space 22 created when the log 68 is reduced from twenty entries to ten entries. Entries in the logs are written in a circular fashion such that the newest data overwrites the oldest data. In the course of shrinking the log 68 from twenty entries to ten entries, preferably only the oldest entries are removed and the remaining entries relocated to be contiguous with entries 64. Inasmuch as logs 68 are grouped in a different segment than logs 64, 66, it will be understood that the corresponding tag entries for the exemplary segment to which logs 68 belong will be shrunk from twenty to ten entries as well. Shrinking the size of the corresponding tag entries is duplicative of this description and thus will not be presented here for brevity. Thereafter, the free space 22 is relocated to the end of the overall memory area, as indicated in FIG. 9C.

The next step in the exemplary process of changing the number of entries in log 64 and 66 to fifteen and changing the number of entries in log 68 to ten is relocating of free space 22 to be proximate to both the log 64 and log 66. FIG. 9D shows the exemplary system with the free space relocated. Finally, FIG. 9E shows the completed system with log 64 and 66 now having fifteen entries, and log 68 having only ten entries. Before proceeding, it must be understood that the order in which the exemplary entries change was presented was based on clearing or creating free space 22 in the log 68, and then making that free space part of the logs 64 and 66 for their additional entries. If, however, there was sufficient free space within the system already existing, then increasing the size of entry 64 and 66 could have been done prior to shrinking the size of entry 68. As FIGS. 9A–9E exemplify, in the case of increasing the number of entries for a particular log, no historical data is lost; rather, additional space is created in each log for the addition of log entries. Again, however, changing the number of entries in the log 64 and 66 belonging to a first segment requires a corresponding change in the number of tag entries, since one tag entry applies to each entry in the log 64 and 66. A discussion with regard to increasing or decreasing the tiumber of tag entries is duplicate of that presented with respect to increasing the log entries, and thus need not be presented for an understanding.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for maintaining a historical database of information comprising:
   a microcontroller;
   a read only memory (ROM) device coupled to the microcontroller, the ROM device storing programs executable by the microcontroller that stores data in the historical database;
   a random access memory (RAM) device coupled to the microcontroller and containing the historical database, the RAM device comprising a set of continuously addressed memory locations, and wherein a first portion of the continuously addressed memory locations comprises a segment component, a second portion of the continuously addressed memory locations comprises a point component, a third portion of the continuously addressed memory locations comprises time-stamp data, and a fourth portion of the continuously addressed memory locations comprises log data; and
   wherein the first portion is continuous with the second portion which is continuous with the third portion which is continuous with the fourth portion.

2. The system for maintaining a historical database of information as defined in claim 1 wherein the segment component in the first portion of the continuously addressed memory locations further comprises:
   a plurality of segments, each segment comprising:
      a list of points of the second portion of continuously addressed memory locations associated with the segment; and
      a list of locations in the third portion of the continuously addressed memory locations associated with the segment.

3. The system for maintaining a historical database of information as defined in claim 1 wherein the point component the second portion of the continuously addressed memory locations further comprises a plurality of points, each point comprising a list of locations in the fourth portion of the continuously addressed memory locations where log data corresponding to the plurality of points are stored.

4. The system for maintaining a historical database of information as defined in claim 3 wherein the time-stamp data of the third portion of the continuously addressed memory locations further comprises a set of time-stamp data for each of the segments in the first portion of the continuously addressed memory locations.

5. The system for maintaining a historical database of information as defined in claim 4 wherein the point component of the second portion of the continuously addressed memory locations further comprises a plurality of points, each point comprising a list of locations in the fourth portion of the continuously addressed memory locations where log data corresponding to each point is stored.

6. The system for maintaining a historical database of information as defined in claim 5 wherein the point component of the second portion of the continuously addressed memory locations further comprises a plurality of points, each point comprising a list of locations in the fourth portion of the continuously addressed memory locations where log data corresponding to the plurality of points are stored.

7. The system for maintaining a historical database of information as defined in claim 6 wherein the segment component in the first portion of the continuously addressed memory locations further comprises:
   a plurality of segments, each segment comprising:
      a list of points of the second portion of continuously addressed memory locations associated with each segment; and
      a list of locations in the third portion of the continuously addressed memory locations associated with each segment.

8. A computer comprising:
   a microcontroller;
   a read only memory (ROM) device coupled to the microcontroller and storing a software programs executable by the microcontroller that calculates natural gas volumetric flow; and
   a historical database of volumetric flow data stored in a random access memory (RAM) device coupled to the microcontroller, the RAM device comprising a set of memory locations, and wherein a first portion of the memory locations comprises a segment component, a second portion of the memory locations comprises a point component, a third portion of the memory locations comprises a time-stamp, and a fourth portion of the memory locations comprises log data.

9. The computer as defined in claim 8 wherein the first portion is continuous with the second portion which is continuous with the third portion which is continuous with the fourth portion.

10. The computer as defined in claim 8 wherein the segment component in the first portion of the memory locations further comprises:
    a plurality of segments, each segment comprising:
       a list of points of the second portion of memory locations associated with each segment; and
       a list of locations in the third portion of the memory locations associated with each segment.

11. The computer as defined in claim 8 wherein the point component of the second portion of the memory locations further comprises a plurality of points, each point comprising a list of locations in the fourth portion of the memory locations where log data corresponding to the plurality of points are stored.

12. The computer as defined in claim 8 wherein the time-stamp of the third portion of the memory locations further comprises a set of time-stamp data for each of the segments in the first portion of the memory locations.

13. The computer as defined in claim 12 wherein the point component of the second portion of the memory locations further comprises a plurality of points, each point comprising a list of locations in the third portion of the memory locations where log data corresponding to each point is stored.

14. The computer as defined in claim 13 wherein the point component of the second portion of the memory locations further comprises a plurality of points, each point comprising a list of locations in the fourth portion of the memory locations where log data corresponding to the plurality of points are stored.

15. The computer as defined in claim 14 wherein the segment component in the first portion of the memory locations further comprises:
    a plurality of segments, each segment comprising:
       a list of points of the second portion of memory locations associated with each segment; and
       a list of locations in the third portion of the memory space associated with the each segment.

16. The computer as defined in claim 15 wherein the first portion is continuous with the second portion which is continuous with the third portion which is continuous with the fourth portion.

* * * * *